Feb. 26, 1952       R. S. TICE       2,587,075
COCKTAIL GLASS COOLER AND METHOD
Filed July 11, 1947
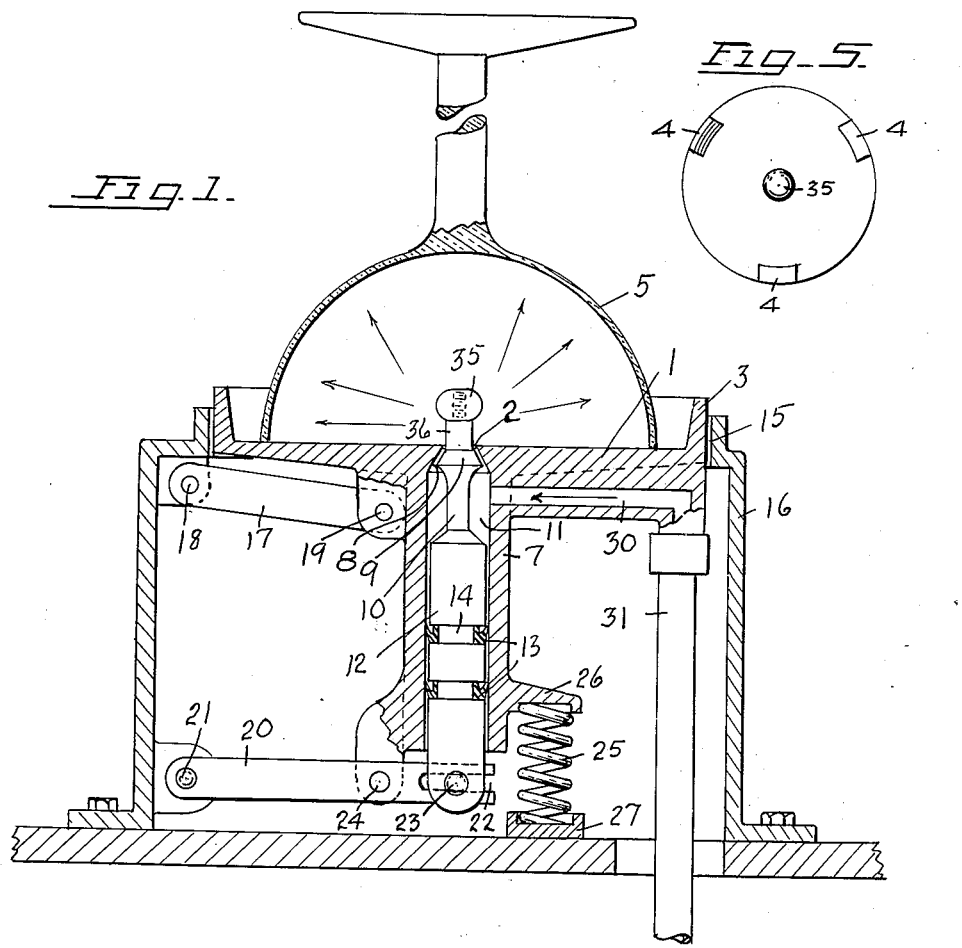
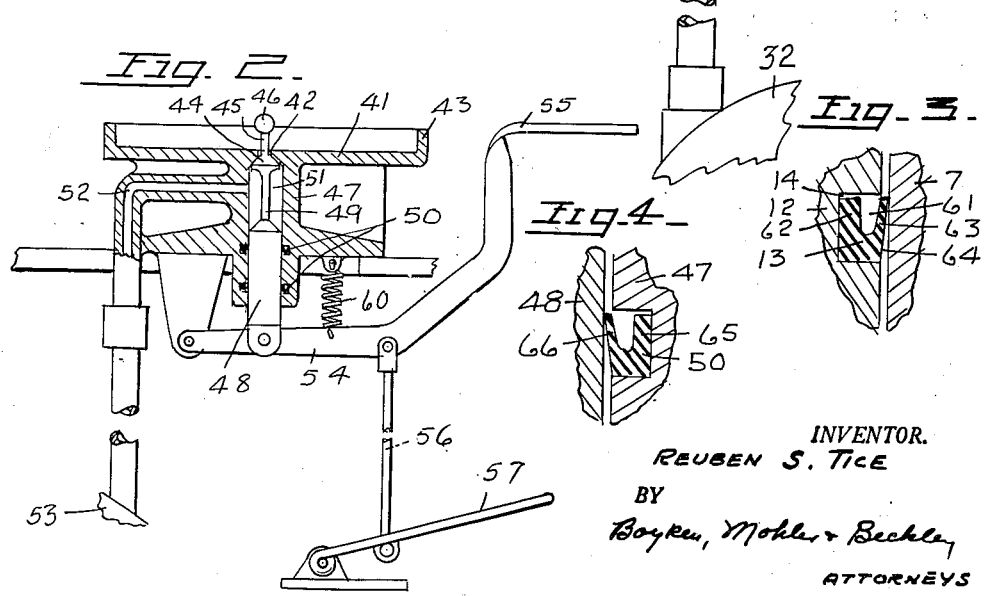
INVENTOR.
REUBEN S. TICE
BY
Boyken, Mohler & Beckley
ATTORNEYS Patented Feb. 26, 1952

2,587,075

UNITED STATES PATENT OFFICE 2,587,075

COCKTAIL GLASS COOLER AND METHOD

Reuben S. Tice, Monterey, Calif.

Application July 11, 1947, Serial No. 760,401

16 Claims. (Cl. 62—91.5)

1

This invention relates to a cocktail glass cooler and has for one of its main objects the provision of means for practically instantly cooling cocktail glasses in a simple and economical manner and also an improved method of cooling cocktail glasses.

In the preparation and dispensing of cocktails, the precooling of the glasses is an essential operation. Heretofore the customary procedure has been for the operator to place ice cubes in the glasses and then to move the glasses in a more or less rotary path so as to cause the cubes to revolve in the glasses around their sides, thus cooling the latter. Inasmuch as these steps take time that is quite valuable in cocktail bars where highly skilled mixers are employed, the procedure is many times performed in a more or less perfunctory manner and in any event the beverage is diluted to some extent and the glasses are usually undesirably wet to some extent on the outside as well as the inside due to the handling of the ice and spillage.

Attempts have been made to overcome at least some of the objections above mentioned, as is shown in United States Letters Patent No. 2,115,753 of May 3, 1938, and No. 2,127,706 of August 23, 1938, both of which were issued to Harry Talbot. However, these attempts still required the use of ice and did not overcome the objections to ice and the same amount of time was required to cool the glasses.

By the present invention, all of the objections above mentioned are overcome and the glasses are dry and are uniformly and thoroughly chilled to the desired degree. The cooling is almost instantaneous. It is pertinent to note that with dry glasses the likelihood of infection from germs in moisture on the glass is practically eliminated.

Another object of the invention is the provision of means whereby a beverage dispensing operator may substantially instantly cool a glass by a single motion between picking up the glass and filling it with a beverage and without releasing his hold on the glass.

An additional object of the invention is the provision of simple and economical means for cooling cocktail glasses and the like by the expansion of liquid $CO_2$ within the glass.

A still further object of the invention is the provision of means for automatically forming a thin film of dry ice on the inside of a cocktail glass or glass tumbler and the like upon positioning the open side of the glass over an injection nozzle.

2

An added object is the provision of means for cooperating with a cocktail glass and the like to form a closure over the mouth of such glass and at the same time to cause the expansion of liquid $CO_2$ within the space enclosed by said glass and said means whereby the glass will be instantly and thoroughly chilled and ready for a beverage.

In the drawings:

Fig. 1 is a vertical sectional view through one form of the invention.

Fig. 2 is a reduced size vertical sectional view through another form of the invention than is shown in Fig. 1.

Fig. 3 is an enlarged fragmentary sectional view taken through one of the packing rings of Fig. 1.

Fig. 4 is an enlarged fragmentary sectional view taken through one of the packing rings of Fig. 2.

Fig. 5 is a reduced size plan view of a slightly different platform or table than is shown in Figs. 1, 2.

In detail, the cooler illustrated in Fig. 1 comprises a circular platform I having a central opening 2 formed therein. The diameter of said platform is preferably slightly greater than the diameter of the rim of the largest size cocktail glass that may reasonably be used.

This platform I preferably has an upstanding flange 3 around its edges although such flange is not essential to the accomplishment of the desired result. The flange 3 or spaced upward projections 4 equally spaced from opening 2, as seen in Fig. 5, facilitates the positioning of the bowl of the cocktail glass 5 over the platform in inverted position with the rim of the bowl substantially concentric with the opening 2. It is quite desirable that this positioning of the glass be effected to insure a uniform cooling of the bowl.

Coaxial with the platform I and depending from the underside thereof is a hollow cylindrical projection 7 of greater internal diameter than that of opening 2. The inner sides 8 of opening 2 at its juncture with the inside of projection 7 are slanted to provide a tapered valve seat for a vertically reciprocable valve body 9 that has correspondingly tapered outer sides adapted to make a gas and fluid tight seal with the said sides 8 of said opening.

A stem 10 coaxial with body 9 and integral therewith extends downwardly therefrom in the bore of projection 7, said stem being of reduced diameter providing a space 11 between the stem and said bore.

Stem 10 is enlarged at its lower end portion 12 to about fit the bore of projection 7 and packing rings 13 of neoprene or any other similar material are preferably disposed in grooves 14 formed in the outer sides of portion 12. These packing rings are best shown in Fig. 3.

The platform or table 1 is vertically reciprocable in an opening 15 that is formed in the upper side of a housing or frame 16. A horizontally extending link 17 is pivotally connected at one of its ends with said frame by a pivot 18 while a pivot 19 pivotally connects the opposite end with the table 1.

A second horizontally extending link 20 is pivotally connected at one of its ends to frame 16 by a pivot 21 while the opposite end is formed with a longitudinally extending slot 22 through which extends a horizontal pivot 23 carried by the enlarged lower end 12 of the vertically reciprocable valve body 9.

A horizontal pivot 24 pivotally connects the link 20 with the tubular projection 7 at a point adjacent the lower end of the latter and between pivots 21, 23.

The table 1 is yieldably held in elevated position by a coil spring 25 that reacts between a lateral projection 26 on the tubular projection 7 and a portion 27 of the frame. This spring also maintains the valve body 9 seated against the seat 8.

A duct or passageway 30 preferably formed integrally with the table 1 opens at one end into the space 11 that is around stem 10 between the valve body 9 and the lower enlargement 12. The opposite end of the duct is adapted to connect with a flexible conduit 31 that is connected with a source 32 of liquid $CO_2$ that is under pressure.

The packing rings 13 prevent leakage past the enlargement 12 while the valve body 9 seals the upper end of space 11 and the $CO_2$ pressure in said space contributes toward maintaining the body 9 in sealing engagement with the seal in opening 2.

In operation, the operator merely places the bowl of the inverted cocktail glass 5 on table 1 and depresses the latter, thereby immediately opening the valve and depositing a spray of liquid $CO_2$ on the bowl for frosting thereon and consequent cooling of the glass upon sublimation of the Dry Ice so formed.

In order to insure a uniform distribution of the $CO_2$ within the bowl to effect uniform cooling thereof, a ball-like deflector 35 is secured to the valve body 9 by a stem 36 that projects through opening 2. The clearance between said stem 36 and opening 2 is preferably from about .001 to .002 of an inch, thus only a small amount of $CO_2$ will be injected into the glass upon a momentary opening of the valve and said $CO_2$ will be more or less atomized and uniformly directed and deposited against the walls of the glass, both by reason of stem 36 and deflector 35 and by reason of the substantial centering of the bowl of the glass over the opening 2 and deflector.

In the form of the invention as shown in Fig. 2, a table 41 having a central opening 42 therein and a flange 43 therearound is shown. A tapered valve seat at said opening is adapted to form a seal with a vertically reciprocable valve body 44, which body has an upstanding stem 45 extending through the opening 22 the same as stem 36 in Fig. 1 and a deflector 46 is at the upper end of said stem.

Projection 47 below the table has a cylindrical bore coaxial with opening 42 in which an enlarged lower end portion 48 on valve 44 is carried by a reduced diameter stem 49.

Packing rings 50 are carried in grooves formed in the walls of the bore in projection 47 instead of in the enlargement 48.

Between valve body 44 and the enlargement 48 is a space 51 around stem 49 into which $CO_2$ is admitted through a duct 52 that is connected with a source 53 of liquid $CO_2$ under pressure, such as a conventional high pressure metal flask or bottle.

The valve body 44 is moved downwardly away from seating relation with opening 42 by a manually or foot actuated lever 54, the latter being pivoted at one end to a portion of the table or to any suitable means and being also pivotally connected to the lower end of enlargement 48.

One end 55 of lever 54 may be extended for said manual operation or a link 56 may connect the lever with a foot pedal 57 for foot actuation of the valve, or both extension 55 and the pedal may be used for actuation of either, as desired.

A spring 60 connects lever 54 with any stationary member such as a portion of table 41 or projection 47.

It will be seen that the main difference between this form of the invention, as shown in Fig. 2, and the form shown in Fig. 1 is that the table 41 in the former is stationary and the valve is actuated manually or by the foot, whereas in Fig. 1 the valve is moved under the downward force of the cocktail glass on the table.

The sealing rings 13 in Fig. 1 and 50 in Fig. 2 differ in that the former are on the reciprocable enlargement 12 whereas in Fig. 2 they are carried by the cylindrical projection in which the enlargement 48 is reciprocable. The rings of Fig. 1 can be used on the enlargement 48 of Fig. 2 or the rings of Fig. 2 can be used in the projection 7 of Fig. 1, as desired. The merit of this structure is that very shallow depressions or grooves can be in the enlargement (piston) or in the cylinder and yet a thoroughly tight seal is provided for such pressures as are encountered and without objectionable resistance to movement of the enlargement.

The ring 13 of Fig. 3 is preferably of an oil and acid resistant synthetic rubber or the like in which an axially outwardly facing groove or channel 61 is formed in the side that faces the pressure. The radially inner side 62 of the channel that is in groove 14 is preferably thicker than the opposite side 63 and the radially outer surface 64 of side 63 is preferably tapered inwardly from the free edge of side 63 toward the base of the channel. Thus the fluid under pressure will tend to force the sides of the channel against the bottom of groove 14 and against the sides of the cylinder preventing leakage of fluid past the ring.

The rings 50 of Fig. 2 are the reverse of rings 13 in that the thicker side 65 is the radially outer side that is against the bottom of the stationary groove in the cylinder while the thinner side 66 is against the reciprocable enlargement 48.

While rings 13, 50 may be merely U-shaped in cross-sectional contour, the above construction is preferable.

It is to be understood that the detailed description and drawings are not to be considered restrictive of the invention but are merely illustrative of preferred forms.

I claim:

1. The method of cooling a cocktail glass that comprises forming a coating of solid $CO_2$ against the inner sides of said glass and exposing the inside of said glass to substantially atmospheric pressure for permitting the sublimation of said coating.

2. The method of cooling a cocktail glass that comprises injecting liquid $CO_2$ into the bowl of said glass and against the inner walls of the latter for solidifying on the inner surface of said bowl and then exposing the inside of said glass to substantially atmospheric pressure for permitting the sublimation of said solid $CO_2$.

3. The method of cooling a cocktail glass that comprises substantially closing the mouth of the bowl of the glass to provide an enclosed area of atmospheric pressure, then injecting a spray of liquid $CO_2$ into said area against the inner surface of said glass for solidifying on the said surface and finally opening said mouth and exposing the inside of said glass to substantially atmospheric pressure for permitting sublimation of the solid $CO_2$ on said surface.

4. The method of cooling a cocktail glass that comprises inverting a cocktail glass and injecting a small charge of liquid $CO_2$ under pressure upwardly and into the bowl of said glass and against the inner surface of said bowl for solidifying against the said inner surface, and then permitting the sublimation of the solid $CO_2$ on said surface by exposure to the atmosphere.

5. The method of cooling a cocktail glass that comprises uniformly dispensing a relatively small charge of liquid $CO_2$ against the inner surface of a cocktail glass at atmospheric pressure, thereby forming a thin coating of solid $CO_2$ on said inner surface and the subsequent sublimation of said coating at said pressure and temperature whereby the said glass will be chilled.

6. A cocktail glass cooling device comprising a source of liquid $CO_2$ and a passageway communicating therewith having a discharge opening at one end thereof, a valve in said opening, means for positioning the open side of the bowl of a cocktail glass over said opening, and means for actuating said valve for effecting a discharge of said liquid $CO_2$ into the bowl so positioned, said opening being directed for discharge of said liquid $CO_2$ against the inner surface of said bowl for solidification of said $CO_2$ on said surface.

7. A cocktail glass cooling device comprising a body having a passageway therethrough for liquid $CO_2$, and a discharge opening formed in one side of said body and at one end of said passageway for said $CO_2$, a valve in said discharge opening for opening and for closing the latter to discharge of said $CO_2$, valve opening means positioned adjacent said opening for engagement by a cocktail glass disposed with the open side of its bowl over said opening and connected with said valve for causing opening said valve under the influence of movement of said bowl generally toward said opening, means for automatically closing said valve upon reverse movement of said bowl, and means for connecting said passageway with a source of liquid $CO_2$.

8. A cocktail glass cooling device comprising a body having a passageway therethrough for liquid $CO_2$, and a discharge opening formed in one side of said body and at one end of said passageway for said $CO_2$, a valve in said discharge opening for opening and for closing the latter to discharge of said $CO_2$, valve opening means positioned adjacent said opening for engagement by a cocktail glass disposed with the open side of its bowl directed downwardly over said opening and connected with said valve for causing opening said valve under the influence of movement of said bowl generally toward said opening, a spring for automatically closing said valve upon reverse movement of said bowl, and means for connecting said passageway with a source of liquid $CO_2$.

9. A cocktail glass cooling device comprising a body having a passageway therethrough for liquid $CO_2$, and a discharge opening formed in one side of said body and at one end of said passageway for said $CO_2$, a valve in said discharge opening for opening and for closing the latter to discharge of said $CO_2$, valve opening means positioned adjacent said opening for engagement by the rim of the bowl of an inverted cocktail glass disposed with the open side of said bowl over said opening and means connecting said valve with said valve actuating means for causing opening of said valve under the influence of movement of said bowl downwardly, means for automatically closing said valve upon reverse upward movement of said bowl.

10. A cocktail glass cooler comprising a plate having a flat side adapted to extend over the open side of the bowl of a cocktail glass for enclosing the space within said bowl, a central opening formed in said plate for discharge of liquid $CO_2$ therethrough into said space, a valve in said opening actuatable for opening and closing the same to such discharge, and means for so actuating said valve.

11. A cocktail glass cooler comprising a plate having a flat side adapted to extend over the open side of the bowl of a cocktail glass for enclosing the space within said bowl, a central opening formed in said plate for discharge of liquid $CO_2$ therethrough into said space, a valve in said opening actuatable for opening and closing the same to such discharge, means supporting said plate and said valve for relative movement from closed position of said valve closing said opening to open position under the influence of pressure of said glass against said plate when the space within the bowl is closed by said plate, and means for returning said plate and valve to said closed position upon release of such pressure.

12. A cocktail glass cooler comprising a plate having a flat side adapted to extend over the open side of the bowl of a cocktail glass for enclosing the space within said bowl, a central opening formed in said plate for discharge of liquid $CO_2$ therethrough into said space, a valve in said opening actuable for opening and closing the same to such discharge, and means for so actuating said valve, deflector means within the said space for deflecting $CO_2$ discharged into said space toward the walls of said bowl.

13. A cocktail glass cooler comprising a plate having a flat side adapted to extend over the open side of the bowl of a cocktail glass for enclosing the space within said bowl, a central opening formed in said plate for discharge of liquid $CO_2$ therethrough into said space, a valve in said opening actuatable for opening and closing the same to such discharge, means supporting said plate and said valve for simultaneous movement thereof relatively from closed position of said valve closing said opening to open position under the influence of pressure of said glass against said plate when the space within the bowl is closed by said plate, and means for automatically returning said plate and said valve to said closed position upon release of such pressure.

14. A cocktail glass cooler comprising a horizontal table having a central opening formed therein, said table being formed for engagement of said table by the rim of an inverted cocktail glass with said opening centrally positioned within the outline of the rim, a valve in said opening for opening and closing the latter to discharge of liquid $CO_2$ therethrough into said bowl, means for conducting liquid $CO_2$ to said opening, and valve actuating means for actuating said valve.

15. A cocktail glass cooler comprising a horizontal table having a central opening formed therein, said table being formed for engagement of said table by the rim of an inverted cocktail glass with said opening centrally positioned within the outline of the rim, a hollow cylindrical valve housing carried by said table below the same communicating with said opening, means for connecting said housing with a source of liquid $CO_2$, a valve body reciprocable within said housing for opening and closing said opening to discharge of said $CO_2$ therethrough, said table being movable from an elevated position in which said body closes said opening to a lowered position, means connecting said valve body with said table for moving said body to an open position away from said opening upon said movement of said table to said lowered position, and spring means for yieldably holding said table in said elevated position and for returning said table from said lowered position to said elevated position.

16. A cocktail glass cooler comprising a horizontal table having a central opening formed therein, said table being formed for engagement of said table by the rim of an inverted cocktail glass with said opening centrally positioned within the outline of the rim, a valve in said opening for opening and closing the latter to discharge of liquid $CO_2$ therethrough into said bowl, means for conducting liquid $CO_2$ to said opening, and valve actuating means for actuating said valve, a $CO_2$ distributing member on said valve body and positioned above said table for deflecting $CO_2$ discharged into said glass against the inner sides thereof.

REUBEN S. TICE.

REFERENCES CITED

The following references are of record in the file of this patent:

UNITED STATES PATENTS

| Number | Name | Date |
|---|---|---|
| 1,468,876 | Von Codelli | Sept. 25, 1923 |
| 1,546,682 | Slate | July 21, 1925 |
| 1,586,029 | Cremiev | May 25, 1926 |
| 1,682,751 | Hallerman | Sept. 4, 1928 |
| 1,872,689 | Dickson | Aug. 23, 1932 |
| 2,337,600 | Harris | Dec. 28, 1943 |
| 2,399,679 | Jackson | May 7, 1946 |

FOREIGN PATENTS

| Number | Country | Date |
|---|---|---|
| 650,397 | Germany | Sept. 11, 1939 |